US009201925B2

(12) United States Patent
Yang et al.

(10) Patent No.: US 9,201,925 B2
(45) Date of Patent: Dec. 1, 2015

(54) SEARCH RESULT PREVIEWS

(71) Applicant: Google Inc., Mountain View, CA (US)

(72) Inventors: Sophia Yang, Half Moon Bay, CA (US); Michael R. Gaiman, San Francisco, CA (US); Nicholas G. Fey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 13/671,653

(22) Filed: Nov. 8, 2012

(65) Prior Publication Data

US 2015/0161212 A1 Jun. 11, 2015

Related U.S. Application Data

(60) Provisional application No. 61/604,659, filed on Feb. 29, 2012.

(51) Int. Cl.
*G06F 17/30* (2006.01)

(52) U.S. Cl.
CPC .... *G06F 17/30477* (2013.01); *G06F 17/30867* (2013.01)

(58) Field of Classification Search
CPC .......... G06F 17/3089; G06F 17/30864; G06F 17/30867
USPC ............. 707/5, 711, 812, 765, 728, 769, 706, 707/722, 1/1
See application file for complete search history.

(56) References Cited

U.S. PATENT DOCUMENTS

| | | | |
|---|---|---|---|
| 7,519,595 B2 * | 4/2009 | Solaro et al. ........................... 1/1 |
| 8,073,830 B2 | 12/2011 | Fontes et al. |
| 8,498,982 B1 * | 7/2013 | Cope .............................. 707/722 |
| 2007/0156672 A1 * | 7/2007 | Wolff et al. ....................... 707/5 |
| 2008/0148164 A1 * | 6/2008 | Read .............................. 715/763 |
| 2010/0042592 A1 * | 2/2010 | Stolz et al. ........................ 707/3 |
| 2011/0093515 A1 * | 4/2011 | Albanese ....................... 707/812 |
| 2011/0106829 A1 * | 5/2011 | Pradhan et al. ............... 707/765 |
| 2011/0106846 A1 * | 5/2011 | Matsumoto et al. .......... 707/769 |
| 2011/0320429 A1 * | 12/2011 | Doig et al. ..................... 707/711 |
| 2012/0078895 A1 * | 3/2012 | Chu-Carroll et al. ......... 707/728 |
| 2012/0197857 A1 * | 8/2012 | Huang et al. .................. 707/706 |
| 2013/0066853 A1 * | 3/2013 | Andersson et al. ........... 707/722 |

* cited by examiner

*Primary Examiner* — Mariela Reyes
*Assistant Examiner* — Thong Vu
(74) *Attorney, Agent, or Firm* — Fish & Richardson P.C.

(57) ABSTRACT

Methods, systems, and apparatus, including computer programs encoded on a computer storage medium, for presenting information. In one aspect, a method includes receiving search result data representing a search result and extended result content for the search result, where at least a portion of the received extended result content including off-page content that was obtained from a resource that is not referenced by the search result. The search result is presented and a user interaction with a search result is determined to have occurred. In response to determining that the user interaction occurred, a portion of extended result content for the search result is presented. The extended result content can be presented while maintaining presentation of at least a portion of the search result. A size of the search result location in which the extended result content is presented can be expanded to present a larger portion of the extended result content in the expanded search result location.

27 Claims, 10 Drawing Sheets

SEARCH RESULT PREVIEWS

CROSS-REFERENCE TO RELATED APPLICATIONS

This application claims the benefit under 35 U.S.C. §119 (e) of U.S. Patent Application No. 61/604,659, entitled "SEARCH RESULT PREVIEWS," filed Feb. 29, 2012, which is incorporated herein by reference in its entirety.

BACKGROUND

This specification relates to data presentation.

The Internet provides access to a wide variety of resources such as images, video or audio files, web pages for particular subjects, book articles, or news articles. A search system can identify resources that are responsive to a search query and provide search results that reference the identified resources. Users can view the search results on a display device and request presentation of the resources through interaction with the search results. For example, in response to user interaction with a search result, the resource that is referenced by the search result can be requested for presentation at the display device.

SUMMARY

In general, one innovative aspect of the subject matter described in this specification can be embodied in methods that include the actions of receiving search result data representing a search result and extended result content for the search result, at least a portion of the received extended result content including off-page content that was obtained from a resource that is not referenced by the search result; presenting the search result in a search result location of a search results page, the search result location having a first perimeter of a first perimeter length; determining that a user interaction with a search result has occurred, the user interaction being indicative of a user request for presentation of extended result content for the search result; and in response to determining that the user interaction occurred: presenting, within the search result location, a portion of extended result content for the search result with which the user interaction occurred, the extended result content being content that has been identified as relevant to the search result, the extended result content being presented while maintaining presentation of at least a portion of the search result; expanding a size of the search result location in which the extended result content is presented, the search result location being expanded to have a second perimeter of a second perimeter length that exceeds the first perimeter length; and presenting a larger portion of the extended result content in the expanded search result location. Other embodiments of this aspect include corresponding systems, apparatus, and computer programs, configured to perform the actions of the methods, encoded on computer storage devices.

These and other embodiments can each optionally include one or more of the following features. Presenting a portion of extended result content can include replacing only a portion of the search result with the portion of the extended result content. Determining that the user interaction occurred can include determining that a user swipe occurred, the determination that the user swipe has occurred being based, at least in part, on detection of a pointer at multiple locations along a path that extends from a first display location to a second display location, the first display location being within a threshold distance of the search result location. Determining that the user interaction occurred can include determining that a user interacted with an extended result element that was presented in the search result location.

Replacing a portion of the search result with the portion of the extended result content can include animating the portion of the search result in a manner that causes the portion of the search result to move in a direction of the user swipe. Replacing a portion of the search result with the portion of the extended result content can include animating the portion of the extended result content in a manner that causes the portion of the extended result content to move in the direction of the user swipe until the portion of the extended result content has completely replaced the portion of the search result.

Expanding a size of the search result location can include increasing a vertical length of the search result location. Methods can further include the action of shifting one or more additional search results down the search results page, a distance of the shifting being based on a distance by which the vertical length is increased.

Methods can further include the action of preventing presentation of the extended result content prior to user interaction with the search result. Receiving search result data representing the extended result content can include receiving image data that represent two or more web pages of a network domain that is referenced by the search result. Receiving search result data representing the extended result content can include receiving information that has been identified as relevant to the search query for which the search result was provided, the received information having been obtained from a vertical specific search.

Methods can further include the actions of determining that a user swipe of the extended result content has occurred; and in response to determining that user swipe of the extended result content has occurred, replacing the extended result content with different extended result content.

Methods can further include the actions of determining that a user tap on the extended result content has occurred; and initiating a request for a resource that was visually represented at a display location that is within a threshold distance of a location at which the user tap was detected.

Particular embodiments of the subject matter described in this specification can be implemented so as to realize one or more of the following advantages. Users are enabled to access additional information about a resource that is referenced by a search result without initiating a request for presentation of the resource. The additional information can be, for example, images representing resources that are from a same domain to which the search result links, and these images can be presented in a portion of the search result so that the images can be presented at tablet computing devices or other devices that may have limited display areas. Since presentation of the images can be performed without requesting the resource, the images can be presented more quickly than the resource can be presented, and without navigating away from the search results page. The additional information can also be, for example, images that are images, audio, or video that are presented with resources referenced by the search result, or other information that is related to the search result, e.g., a map showing a location of a business referenced by the search result, or user reviews of a business or attraction referenced by the search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
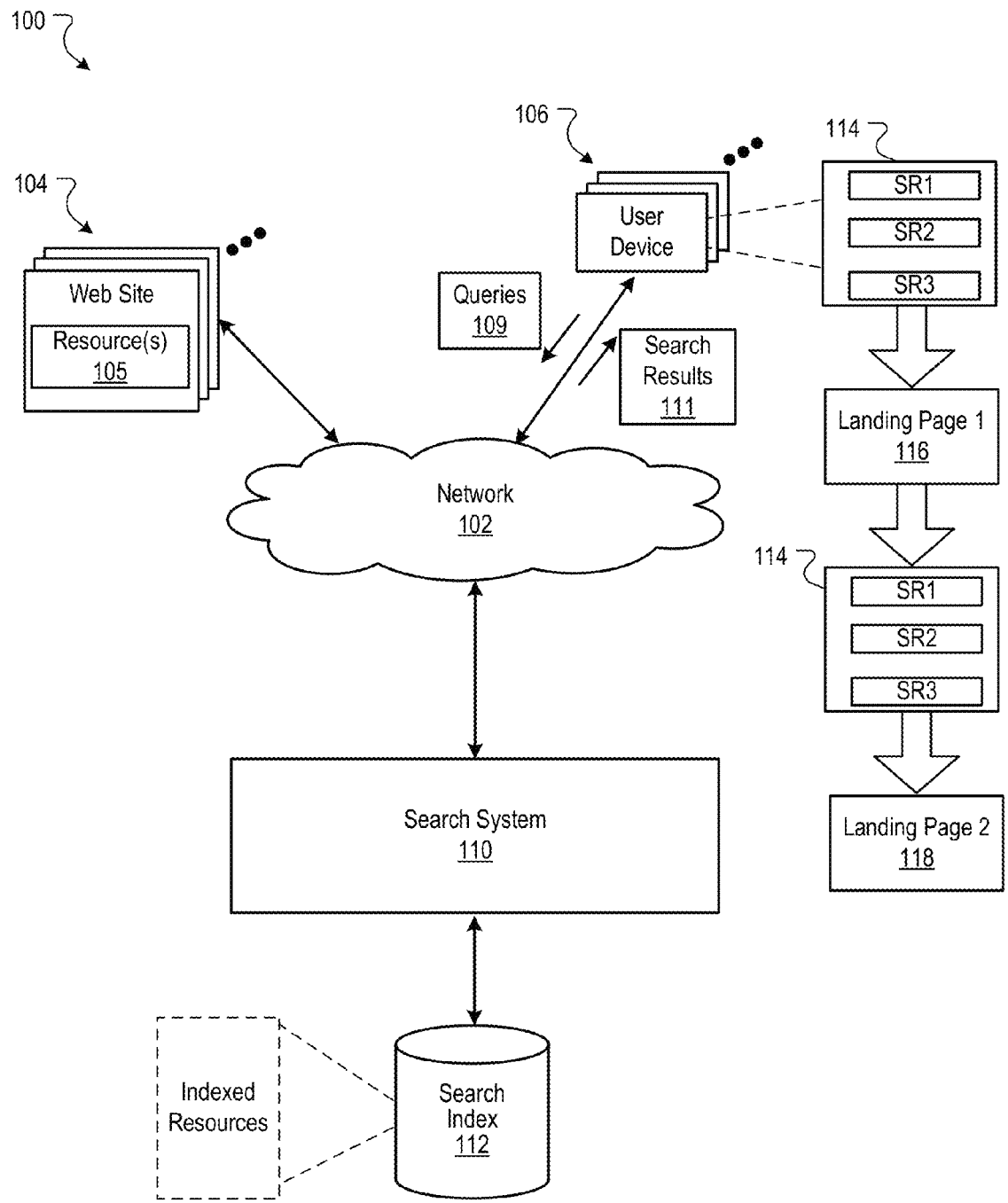
FIG. 1 is a block diagram of an example environment in which a search system provides search services.

The availability of portable computing devices is increasing, and many of these devices have touch screens that enable a user to use a finger or another pointer to interact with content. For example, users using a tablet computing device can interact with a search result by touching a location of the touch screen at which the search result is presented. This user interaction with the search result initiates a request for a resource that is referenced (e.g., linked to) by the search result, and the resource can be presented in the browser (or another application) that is operating on the computing device.

To increase usability of tablet devices in search environments, the tablet device can be configured to accept additional user interactions with a search result that allow the user to access extended result content. Extended result content is information presented in a search result in response to the occurrence of a specified user interaction with the search result. The extended result content includes information beyond that initially presented in the search result, and can include information about a resource that is referenced by the search result and/or additional information that has been identified as relevant to a same topic as the search result or a search query for which the search result was presented.

In some implementations, at least a portion of the extended result content for a search result for a particular web page is off-page content for that particular web page. Off-page content for a particular resource (e.g., a particular web page) is content that is obtained from a resource that is not referenced by (e.g., linked to by) the search result for the particular resource, while on-page content for the particular resource is content that is obtained from the particular resource that is referenced by the search result. For purposes of illustration, assume that a particular search result includes a link to a web page at www.example.com. In this example, the on-page content for this search result will be content obtained from the web page that is located at www.example.com, while the off-page content for this search result would include content that was obtained from a web page other than example.com and/or content that is not included on the web page www.example.com.

The extended result content that a user can access through user interaction with a particular search result can include, for example, preview graphics for resources from the domain to which the particular search result links. A preview graphic is an image that includes one or more visual representations of information that has been identified as relevant to a resource from the network domain to which a search result links or a search query for which the search results are being provided. For example, a preview graphic may include visual representations of three different web pages from a same domain (e.g., example.com).

The extended result content that the user can access through user interaction with a search result can also include other information that has been identified as relevant to the search query for which the search result was provided. For example, the extended result content can include textual information about a business that has been identified as relevant to the search query, a map indicating a business location of a business that has been identified as relevant to the search query, user reviews of the business that has been identified as relevant to the search query, audio or video files that have been identified as relevant to the search query, images that have been identified as relevant to the search query, information about products that have been identified as relevant to the query, or news articles that have been identified as relevant to the search query. As described in more detail below, the extended result content can be organized according to a type of information e.g., images, news, shopping, and a user can access the different types of extended result content by iteratively interacting with the search result in a specified manner.

In some implementations, a user can request presentation of extended result content for a particular search result by performing a user interaction that is indicative of a request for presentation of the extended result content. For example, a user swipe of the search result may be indicative of a request for the extended result content, such that extended result content may be presented in response to detection of a user swipe. When the user swipe is detected, a portion of the search result can be replaced with extended result content, while another portion of the search result continues to be presented. For example, a text snippet that is presented in a search result can be replaced by a preview graphic, while a title and/or network location for the search result can continue to be presented in the search result. An additional preview graphic, or other extended result content such as images that have been identified as relevant to the search query, can be presented in response to user interaction with (e.g., swipe of) the presented preview graphic. Extended result content can be presented without initiating a resource request following presentation of the search results page, such that the user need not navigate away from the search results page to view extended result content.

Many of the examples provided in the description that follows refer to a web page preview as an example of extended result content that is presented to a user in response to a user request for extended result content. The description that follows is also applicable to other types of extended result content, such as extended result content that includes information about a business that has been deemed relevant to the search query, audio or video content that has been deemed relevant to the search query, or other information related to a topic or entity to which a search result or search query has been identified as relevant.

FIG. 1 is a block diagram of an example environment 100 in which a search system 110 provides search services. The example environment 100 includes a network 102, e.g., a local area network (LAN), wide area network (WAN), the Internet, or a combination of them, that connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A user device 106 is an electronic device that is capable of requesting and receiving resources 105 over the network 102. Example user devices 106 include personal computers, mobile communication devices, and other devices, such as tablet computing devices, that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

The search results 111 (e.g., SR1, SR2, SR3) are presented in a search results page 114 that is displayed at the user device 106. User interaction with a search result (e.g., SR1) causes the user device 106 to request a landing page (e.g., Landing Page 1 (116)) referenced by the search result. In some implementations, the user device 106 submits a hypertext transfer protocol request for a resource that is located at a uniform resource locator specified by the search result with which the user interaction occurred. For example, user interaction with the search result SR1 can cause the user device 106 to request landing page 1 (116) that is referenced by the search result SR1. In response to the request, data that cause presentation of landing page 1 (116) are received by the user device 106 and used to present landing page 1 (116) at the user device 106. In this example, the presentation of landing page 1 (116) may cause a search results page 114 to no longer be presented. For example, a browser that was presenting search results page 114 may present landing page 1 (116) in place of the results page 114.

To view additional landing pages for additional search results, a user can again request presentation of search results page 114, for example, by interacting with a "back" element that is provided in their browser. Interaction with the "back" element will again cause presentation of the search results page 114, and the user can then interact with another search result, such as SR2, to request presentation of landing page 2 (118) that is referenced by the other search result. Similar interaction with the "back" element and additional search results can be iteratively performed to continue to view landing pages for additional search results. However, these iterative requests for landing pages and re-presentation of search results page 114 can be time-consuming and require submission of multiple requests for resources.

A user device 106 can be configured to present search result previews that are presented in the search results page 114 without navigating away from the search results page 114 (e.g., without requesting another resource following presentation of the search results page). A search result preview is a visual representation (e.g., an image) of a resource that is referenced by a search result. For example, a search result preview can be an image file that, when rendered and presented, visually represents the resource that would be presented in response to a user "tap" (or click) of the search result.

In some implementations, the user device 106 presents a search result preview for a search result in response to a specified user interaction (e.g., a user swipe of a search result or hovering an electronic pointer over the search result) with the search result. For example, in response to detecting the specified user interaction with search result SR1, the user device 106 can present a search result preview that visually represents landing page 1 (116) without navigating away from the search results page 114 (e.g., without requesting another resource). Similarly, if the user device 106 determines that the specified user interaction occurred with search result SR2, the user device 106 can present a search result preview that visually represents landing page 2 (118).

The specified user interaction can be, for example, a user "tap" (or mouse click) of a preview user interface element (i.e., a user interface element, such as a virtual button, that upon user interaction therewith causes presentation of a search result preview) that is presented with the search result. Alternatively, or additionally, the user interaction can be a user "swipe" across the search result. Note that this description refers to user interactions, such as a user "tap" and a user "swipe" that can be performed when a search result is presented at a user device that is equipped with a touch-screen interface. In devices that are not equipped with touch-screen interfaces, user interactions, such as mouse clicks of user specified interface elements can be used instead of a user "tap" or a user "swipe".

The user device 106 can determine that a user "tap" has occurred, for example, when the user device 106 determines that a pointer has engaged the touch screen interface at a particular location and disengaged the touch screen within a threshold distance of the particular location (e.g., at the same particular location or within a specified number of pixels from the particular location). When a user tap occurs at a presentation location of a user interface element (e.g., a preview interface element or another graphic that is presented in the user interface), the user interface element is considered to have been interacted with by the user.

The user device 106 can determine that a user "swipe" has occurred, for example, when the user device 106 determines that a pointer has engaged the touch screen at a particular location and then disengaged the touch screen outside of the threshold distance of the particular location. For example, when the user device 106 determines that the pointer has engaged the touch screen at a first location, moved across the touch screen more than threshold distance, and then disengaged the touchscreen at another location, the user device 106 can determine that a user swipe has occurred. In response to detecting a user swipe across (e.g., from left to right or right to left) a search result, the user device 106 can present a search result preview for the search result across which the user swipe occurred.

The user device 106 can be configured to insert at least a portion of a preview graphic into a search result with which the specified user interaction occurred. For example, in response to detecting the specified user interaction with a particular search result, the user device 106 can remove a portion of text from the search result and insert a preview graphic that visually represents three web pages of a web site to which the search result links.

Alternatively, or additionally, the user device 106 can be configured to insert other types of extended result content, such as off-page content, into the search result with which the user interaction occurred. For example, in response to the user interaction with search result SR1, extended result content that includes one or more images that have been identified as relevant to the search query or the search result SR1 can be presented in a portion of the search result SR1. Other types of extended result content that can be presented in the search result SR1 following the specified user interaction with the search result SR1 includes audio or video files have been deemed relevant to the search query or search result or other information that has been deemed relevant to the search query or search result.

For example, extended result content that is inserted into a search result for a local business (e.g., a business that is within a threshold distance of the user device) can include information about the business such as operating hours, a map illustrating the location of the business, and/or an image of the building in which the business is located. The extended result content for the search result may also include user reviews for the business, example menu items, news headlines for the business, or other information about the business. This information can be on-page and/or off-page content for the search result, and organized, for example, based on information type (e.g., general information, financial information, geographic information, or user feedback). Each user interaction with the search result can cause a different type of information to be presented in the search result. A set of extended result content that is presented together in the search result is referred to as an extended result card, and the presentation of an extended result card in a search result is referred to as insertion of the extended result card in the search result. Insertion of an extended result card into a search result is explained in more detail with reference to FIGS. 2A-F, and as described below, users can navigate between extended result cards by performing a specified user interaction, such as a user swipe.

Figure 2A:
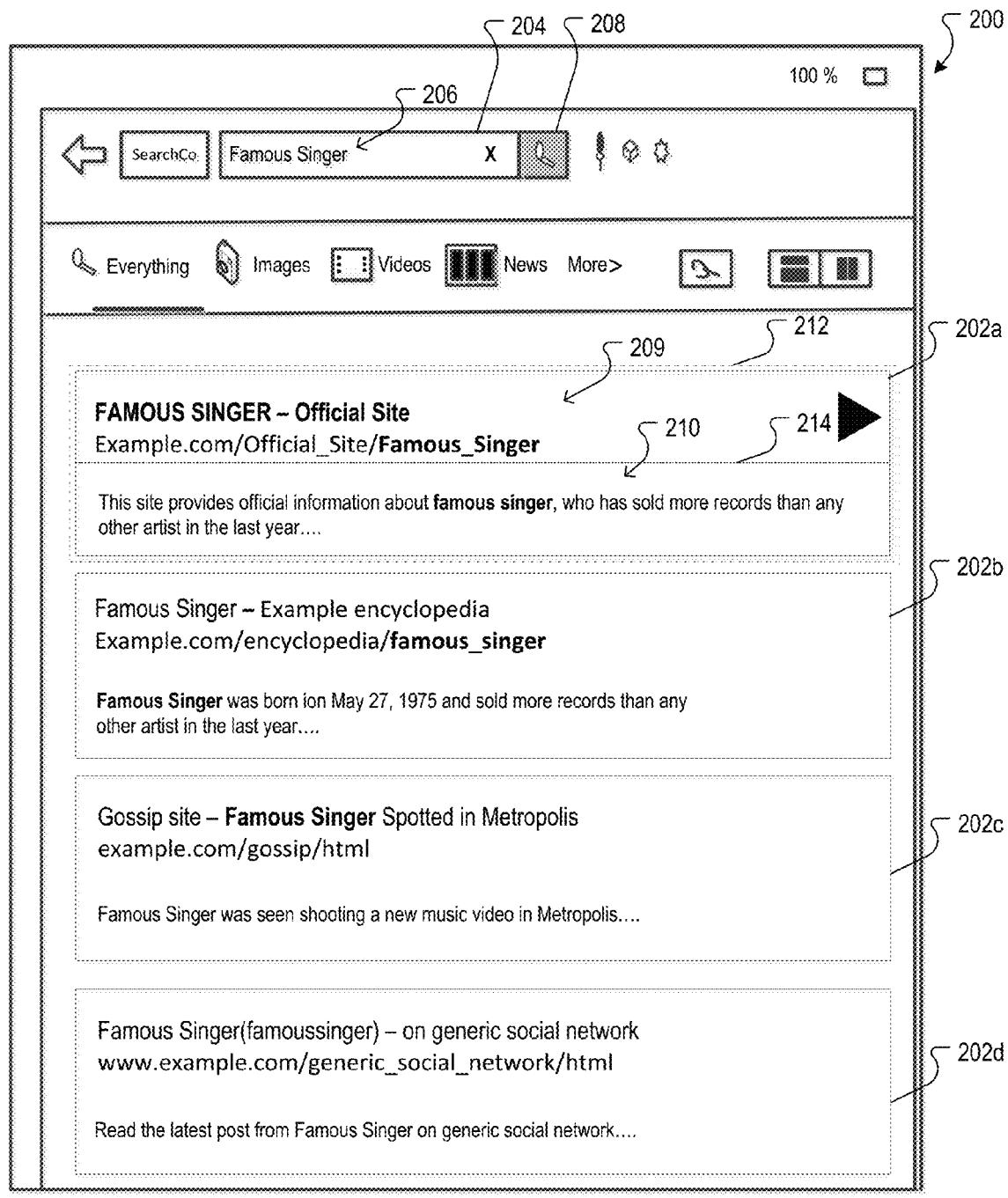
FIGS. 2A-2G are screen shots of an example search interface in which extended result content can be presented.

FIG. 2A is a screenshot of an example search interface 200 in which search results 202*a*-202*d* are presented. The search interface 200 can be presented at a user device, such as a tablet computing device. The search interface 200 includes a query entry field 204 in which a user can enter a search query 206. The search interface 200 also includes a search initiation element 208 with which the search query 206 can be submitted to the search system. For example, in response to user interaction with the search initiation element 208 the user device can submit a search query to a search system as described above with reference to FIG. 1.

The search results 202*a*-202*d* that are presented in the search interface 200 are search results that were received from the search system in response to submission of the search query 206. Each search result can be presented in a separate search result location so that each search result is independently identifiable from other search results.

A search result location is a portion of a search results page in which a particular search result is presented. For example, the search result 202*a* is presented in a search result location that is bounded by the dashed line 212. The dashed line 212 is a conceptual representation of the search result location in which the search result 202*a* is presented and has a perimeter that bounds the search result 202*a*.

The perimeter of a particular search result location can be presented on a search results page (e.g., through shading or highlighting of the area within the perimeter), or the perimeter of the particular search result location may implemented in a manner that the perimeter is not presented on the search results page. Note that the area enclosed by the perimeter of a search result location can be the same as (or larger than) the area of the search result that is presented in the search result location.

A search result can include, for example, a reference portion 209 and a content portion 210. The reference portion 209 is a portion of the search result (e.g., search result 202*a*) in which a title (e.g., "Famous Singer—Official Site") of the resource that is referenced by the search result is presented. The reference portion 209 can further include, for example, a network location (e.g., "Example.com/Official_Site/Famous_Singer") of the resource that is referenced by the search result.

The content portion 210 is a portion of the search result (e.g., search result 202*a*) in which information about the content of the resource referenced by the search result is presented. For example, the content portion 210 for search result 202*a* presents a snippet of text that is included in the resource that is referenced by the search result 202*a*. For purposes of discussion, a dotted line 214 is used to visually delineate the reference portion 209 and the content portion 210. However, such a line need not be included in a search result.

The user device at which the search interface 200 is presented is configured to enable a user to selectively change the content that is presented in the content portion 210 of a search result without initiating another resource request (e.g., without requesting the resource that is referenced by the search result or another search results page) following presentation of the search results page. For example, with reference to FIG. 2 B, detection of a user tap on an extended result interface element 215 can cause presentation of a preview graphic 220 or a different extended result card, e.g., images, in the content portion 210 of the search result 202*a*.

Alternatively, or additionally, if a user swipe from point 216 to the point 218 is detected by the user device, the user device can present the preview graphic 220 in the content portion 210 of the search result 202*a*. The user swipe can be detected by the user device, for example, by detecting engagement of a pointer (e.g., a finger) at the point 216 and at multiple points along the path illustrated by the arrow 222 before disengagement of the pointer is determined to have occurred at point 218. The detection of the user swipe can also include a determination that the points 216 and 218 are at least a threshold distance apart (e.g., where the threshold distance is a distance beyond which a user interaction is considered to be a user swipe).

Figure 2B:
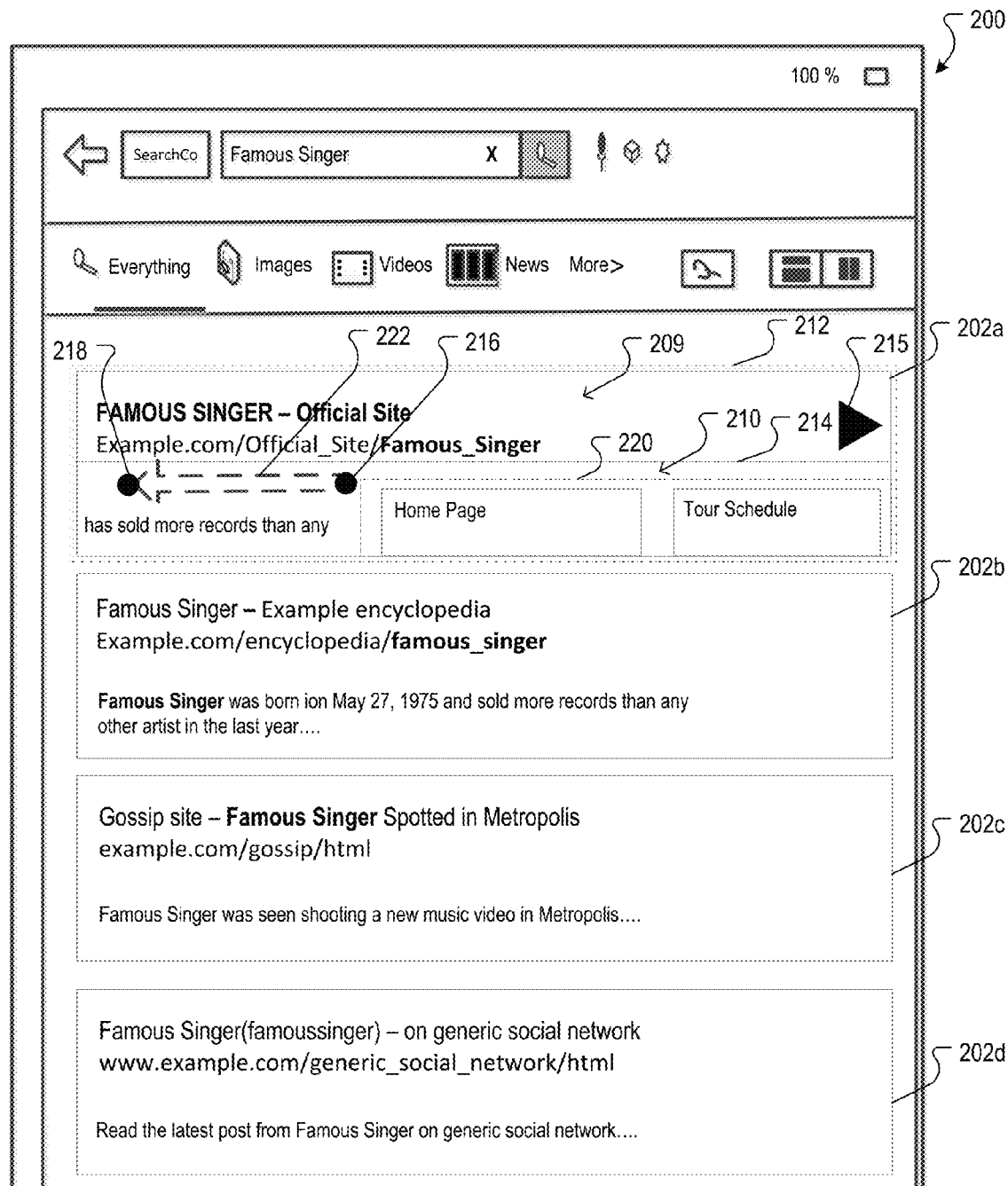

In some implementations, presentation of the preview graphic 220, or another extended result card, can include initially presenting only a portion (e.g., less than 100%) of the preview graphic 220, or another extended result card, at one end of the content portion 210, and animating the preview graphic 220 to move in the direction of the user swipe (e.g., from right to left in FIG. 2B). As the presented portion of the preview graphic 220 moves across the content portion 210, more of the preview graphic is presented to give the visual appearance that the preview graphic is scrolling across the content portion 210. Alternatively, the preview graphic could be presented in the content portion 210 without the animation.

As the preview graphic 220 moves across the content portion 210, the content that was previously presented in the content portion 210 can also move across the content portion 210 and can be removed upon reaching an end of the content portion 210 (e.g., the end of the content portion that is in a same direction as the user swipe and/or an opposite end of the content portion from which additional portions of the preview graphic 220 are being presented). For example, as illustrated by FIG. 2B, the phrase "has sold more records than any" are presented to the left of the original location at which this phrase was originally presented in the content portion 210, and the remainder of the text that was originally presented has been removed.

In this example, as the preview graphic 220 continues to move from right to left, the text will also continue to move from right to left, and the text will be removed as it reaches the left end of the content portion 210. Note that the user device at which the search interface 200 is presented could also be implemented so that the text and/or preview graphic 220 moved from the top of the content portion 210 to the bottom of the content portion 210, or from the bottom of the content portion 210 to the top of the content portion 210.

Figure 2C:
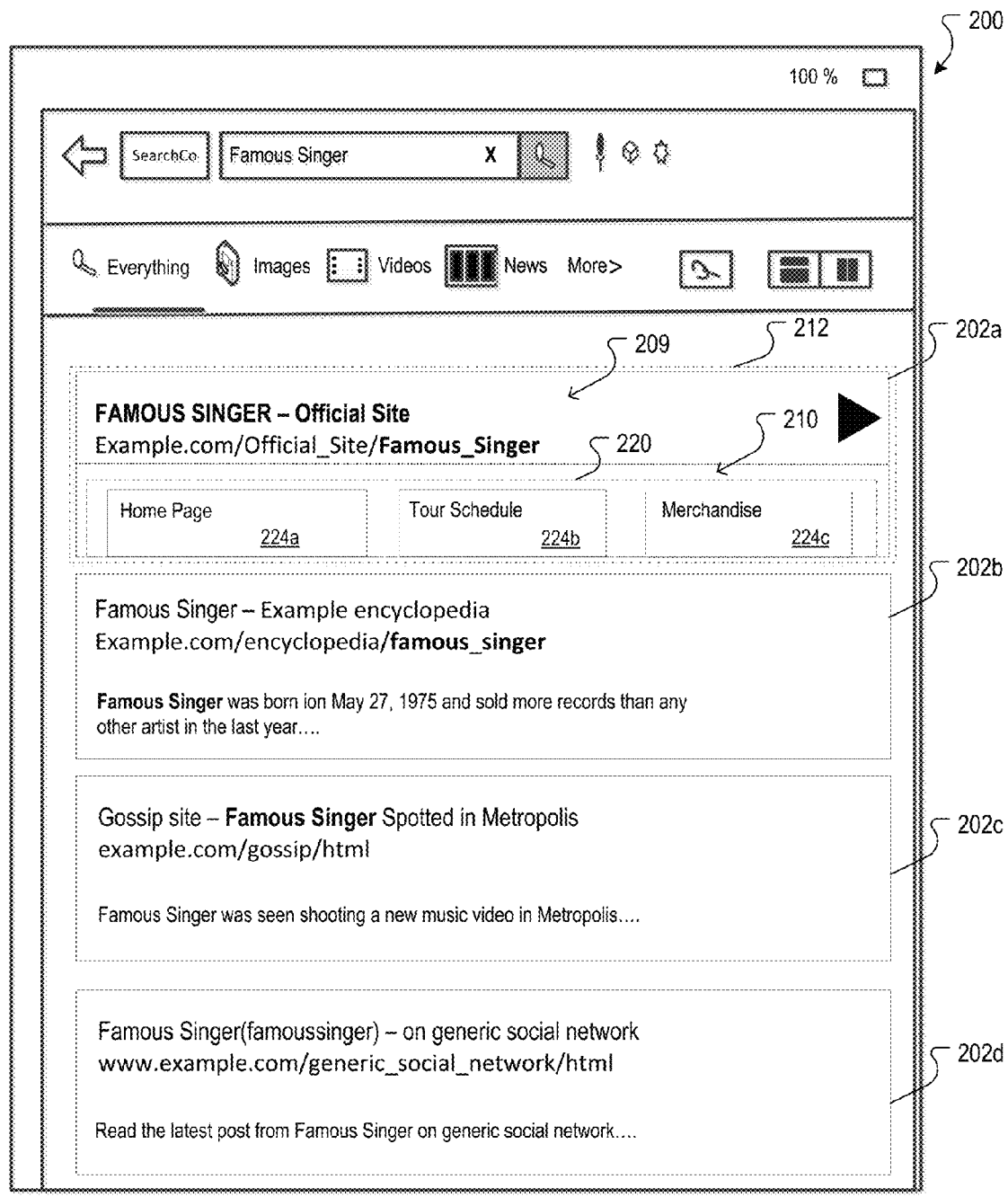

As illustrated by FIG. 2C, the movement of the preview graphic 220 across the content portion 210 can continue until the content that was previously presented in the content portion 210 is no longer presented. The preview graphic 220 includes visual representations 224a-224c (e.g., search result previews) that visually represent three web pages from the web site that is referenced by the search result 202a (e.g., example.com). Visual representation 224a is an image of a "home page" for the web site that is referenced by the search result 202a, while visual representations 224b and 224c are respectively visual representations of a "tour schedule" page and a "merchandise" page from the web site.

In some implementations, even after a preview graphic, or another extended result card, has stopped moving across the content portion of a search result (e.g., from right to left), only a portion of the preview graphic, or another extended result card, is presented in the content portion of the search result. For example, with reference to FIG. 2C, the preview graphic 220 and/or visual representations 224a-224c may have dimensions that are larger than the content portion 210, such that the full preview graphic 220 and/or visual representations 224a-224c will not be completely presented unless a vertical (or horizontal) dimension of the content portion 210 (and therefore, the search result location 212) is increased.

Figure 2D:
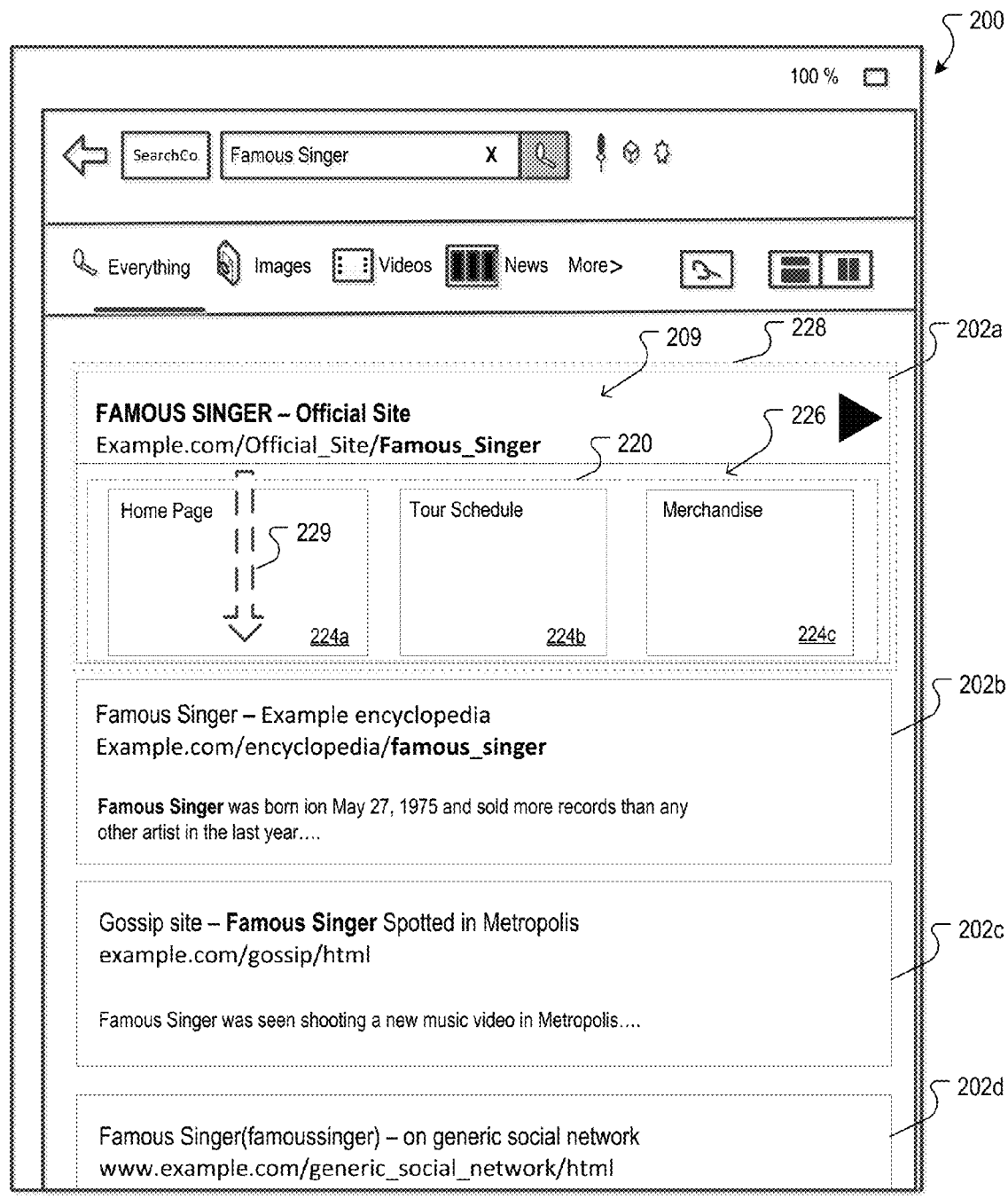

To present all of the preview graphic 220 (or at least a larger portion than that presented in the original content portion 210), the user device can increase the size of the content portion 210 to create an expanded content portion 226 and an expanded search result location 228, as illustrated by FIG. 2D. In some implementations, the user device increases a vertical length of the content portion 210 so that the portion of the preview graphic 220, or another extended result card, that is presented in the expanded content portion 226 is larger than the portion of the preview graphic 220, or another extended result card, that was presented in the content portion 210.

In some implementations, the amount by which the content portion 210 is expanded, and therefore the size of the expanded content portion 226, is based on dimensions of the preview graphic 220 or another extended result card that is to be presented in the content portion 226. For example, the expanded content portion 226 can have a vertical length that is the same as, or larger than, the vertical length of the preview graphic 220 such that the full vertical length of the preview graphic 220 is presented in the expanded content portion 226. Alternatively, or additionally, the expanded content portion 226 can have a vertical length that is proportional to the vertical length of the preview graphic 220 so that at least a threshold portion of the vertical length of the preview graphic 220 is presented. For example, the expanded content portion 226 can have a vertical length that is 90% of the length of the preview graphic 220, so that up to 90% of the preview graphic 220 can be presented in the expanded content portion 226.

The expansion of the content portion 210 can happen automatically, or can occur only in response to detecting an expand user interaction. For example, the expansion of the content portion 210 can occur after an extended result card, such as the preview graphic 220, has stopped moving into the content portion 210 or while the extended result card is moving into the content portion 210. Alternatively, once the extended result card, such as the preview graphic 220, has stopped moving into the content portion 210, as illustrated by FIG. 2C, the user device can maintain the size of the content portion 210 until the expand user interaction has been detected. In response to detecting the expand user interaction, the user device can then expand the content portion 210 to create the content portion 226, as described above. The expand user interaction can be, for example, a user swipe that is in the direction of the arrow 229 (or another direction) or another specified user interaction (e.g., a double "tap" on the content portion 210) that causes expansion of the content portion.

As the user device expands the content portion 210 to create the expanded content portion 226, the user device also shifts other search results down the search interface 200. For example, as illustrated by FIG. 2D, when the expanded content portion 226 is presented in portions of the search interface 200 at which the search result 202b was presented prior to expansion of the content portion 210 (e.g., at display locations at which another search result location was previously defined), the search results 202b-202d can be shifted (i.e., moved) down the search interface 200 so that the search results 202b-202d are not occluded by the expanded content portion 226.

In some implementations, the distance by which the search results 202b-202d are shifted down the search interface 200 is proportional to the distance by which the vertical length of the content portion 210 is expanded to create the content portion 226. For example, the search results 202b-202d (and their respective search result locations) can be moved down the search interface 200 a same vertical distance (e.g., a same number of pixels) as the distance by which the vertical length of the content portion 210 was increased. Alternatively, the distance by which the search results 202b-202d are moved down the search interface can differ from the distance by which the vertical length of the content portion 210 was increased.

Figure 2E:
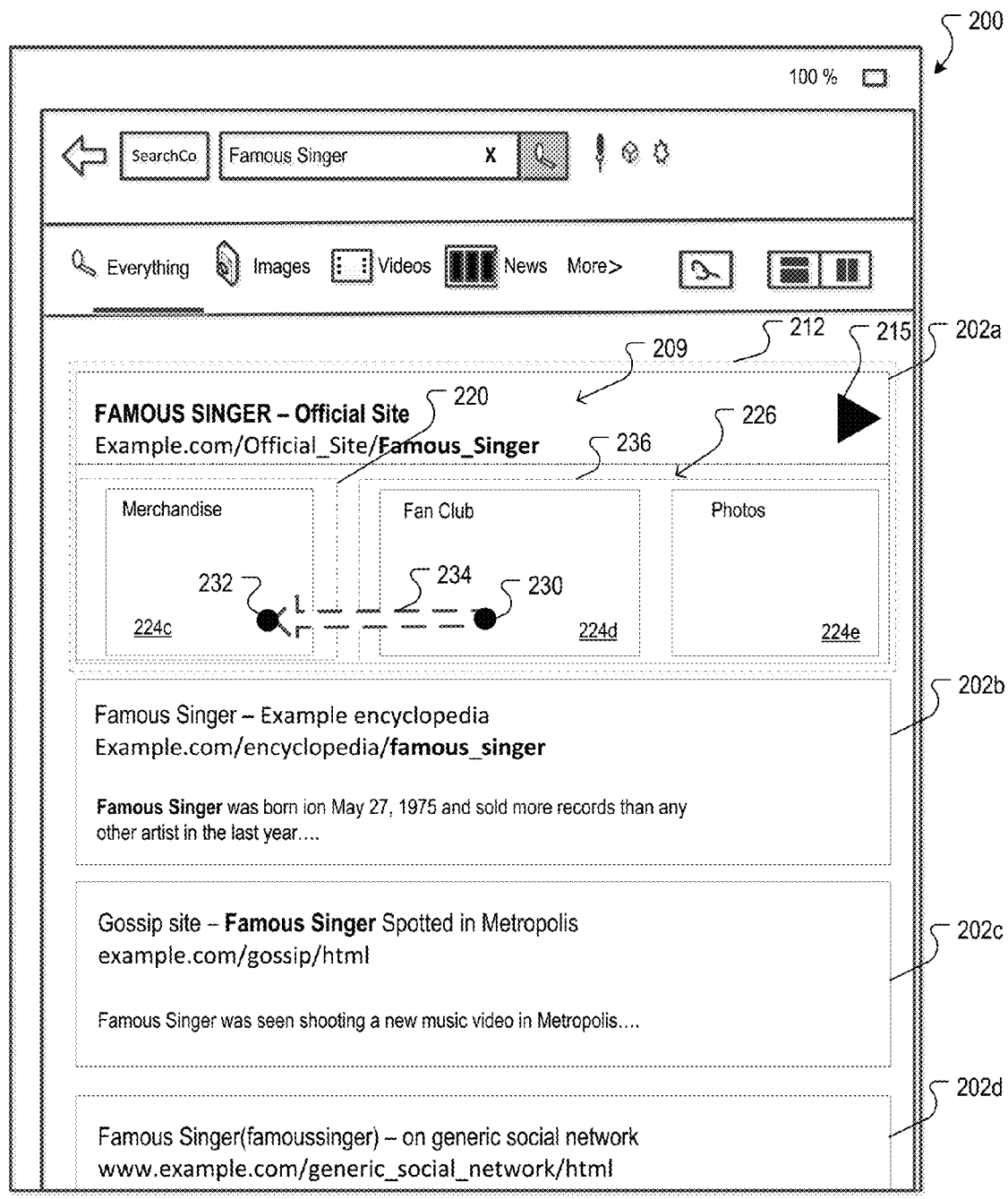

The user device can be implemented to enable a user to change the extended result card that is presented in the content portion 210 and/or the expanded content portion 226, as illustrated by FIG. 2E. For example, in response to a user swipe from points 230 to 232 (i.e., in the direction of the arrow 234), or another specified user interaction, such as user interaction with the extended result interface element 215, the user device can replace the preview graphic 220 with a different extended result card, such as the preview graphic 236.

Figure 2F:
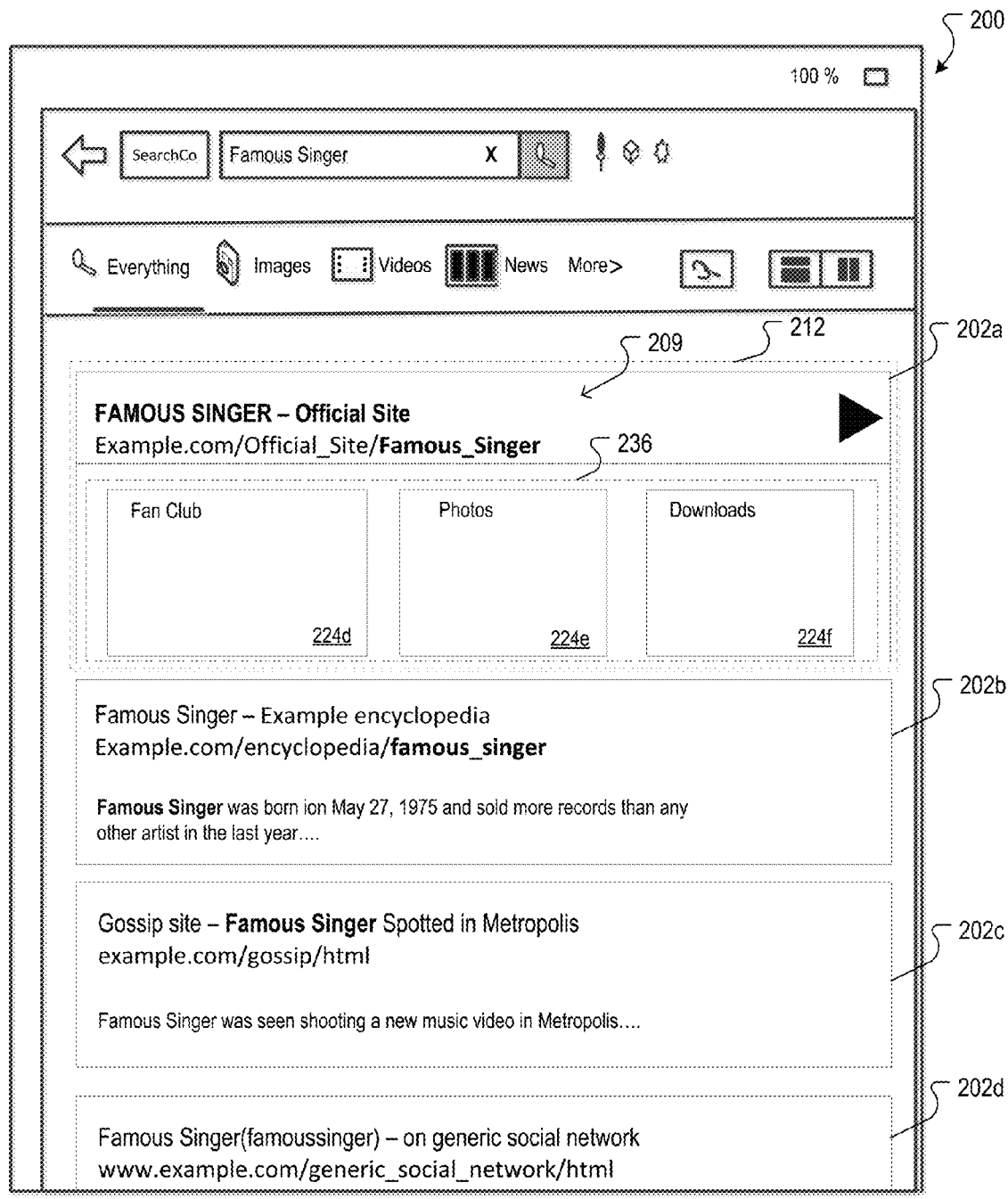

The replacement of one extended result card with another extended result card, such as replacement of the preview graphic 220 by the preview graphic 236, can be performed in a manner similar to that by which the preview graphic 220 replaced the text that was initially presented in the content portion 210. For example, animation can be used so that preview graphic 220 visually appears to be "scrolling" off of the screen while the preview graphic 236 appears to be "scrolling" onto the screen (e.g., from right to left) until the preview graphic 236 has completed scrolling onto the screen, as illustrated by FIG. 2F. The preview graphic 236 is similar to the preview graphic 220, but includes visual representations 224d-224f that represent different resources than the resources that were represented by the visual representations 224a-224c.

While the visual representations that are presented in the preview graphics are visually representative of resources, the visual representations can be created in a manner that provides users with enough information that enables the users to determine whether a site includes information for which the user is searching without precluding user requests for the resource. For example, the resolution of the visual representations may not enable a user to read a substantial portion of the text that is presented on the resource.

The visual representations may facilitate user requests for resources by enabling a user to request a resource using the visual representation. In some implementations, user interaction with (e.g., a user tap of) a visual representation that is presented in the expanded content portion 226 (or the content portion 210) can cause the user device to request the resource that is visually represented by the visual representation. For example, if the user device detects a user tap within a threshold distance (e.g., a threshold number of pixels) of visual representation 224d, the user device can initiate a request (e.g., a hypertext transfer protocol request) for the "fan club" page that is referenced by the visual representation 224d.

As noted above, extended result cards for a search result can include extended result content other than screenshots of the resource to which the search result is linked (e.g., off-page content). For example, an extended result card for a search result can include information that has been identified as relevant to the search query for which the search result was provided and/or relevant to the resource that is referenced by the search result (e.g., by being included in the resource or being relevant to a same topic as the resource).

The extended result content that is included in an extended result card can be identified in resources that are included in the same domain to which the search result links. For example, photos or other content (e.g., audio or video content) that is included in resources in the domain can be identified and grouped together in an extended result card. In this example, a first set of images (e.g., 10 images) can be included in a first extended result card, while a second set of images (e.g., 10 different images) can be included in a second extended result card. As described above, the user can swipe though the various extended result cards to view the images.

The extended result content included in an extended result card can also be off-page content that is obtained from other information sources that are not in the same domain as the search result, aggregated, and organized to provide additional information about the subject matter to which the resource referenced by the search result is relevant. For example, information related to a particular city, such as popular restaurants, maps indicating locations of local attractions, images taken of attractions in the city, and weather information for the city can be identified as extended result content for a search result that references a web site for a city and used to create one or more extended result cards that can be presented following user interaction with (e.g., a user swipe of) the search result that references the web site for the city.

In some implementations, the extended result content that is presented in an extended result card can be provided by publishers, such as an online encyclopedia or an online retailer, that agree to provide information for presentation in extended result cards, thereby engaging users even before the user requests presentation of one of the publishers pages. For example, an online encyclopedia may provide information about various topics, and this information can be organized by information category and presented as extended result content in one or more extended result cards when a search result for the online encyclopedia is presented in response to a search query that matches one of the topics. Thus, using the extended result cards, the user can make an initial determination regarding the relevance of the presented information to the user's informational need, and be more confident that the information presented on the page to which the search result links will provide at least partial satisfaction of the user's informational need.

Similarly, an online retailer may provide information about various products for inclusion into one or more extended result cards. In this example, users can be provided with relevant information about the various products at the search results page, thereby engaging the user prior to the user requesting presentation of the retailer's page (e.g., through a tap or click of the search result). For purposes of example, assume that the search query "brand x camera" is received from a user device, and that Retailer Y has provided information, such as technical specifications, price, and user reviews for the brand x camera. In this example, one or more extended result cards can be created so that in response to a request for an extended result card (e.g., through a user swipe of a search result for the retailer), the user is provided with the product information included in the extended result card.

In some implementations, the extended result content includes information obtained using vertical specific searches. A vertical is a content category to which content is classified, and a vertical specific search is a search that is performed on content that has been identified as belonging to a specific content category. For example, an image search can be performed on content that has been identified as image files, a video search can be performed on content that has been identified as video files, a shopping search can be performed on content that has been identified as offering products for sale, and a news search can be performed on content that has been identified as being news articles.

When a universal search, i.e., a search across content for many different verticals or all verticals, is performed, the extended result content that is selected for a search result can be information that would have been provided in various different vertical specific searches. For example, in response to receiving a universal search request on the search query "dogs", the search system can identify, as extended result content, a set of images that would have been provided in response to an image search using the query dogs. The identified set of images can be grouped together on one or more extended result cards and data representing the extended result cards can be provided with the search results that are provided in response to the universal search request. User interaction with one of the search results can then cause presentation of one of the extended result cards in the search result. Other extended result cards, such as extended result cards for video search results, shopping search results, news search results, or maps search results can also be provided with the search results and presented in response to user interaction with the search results.

Figure 2G:
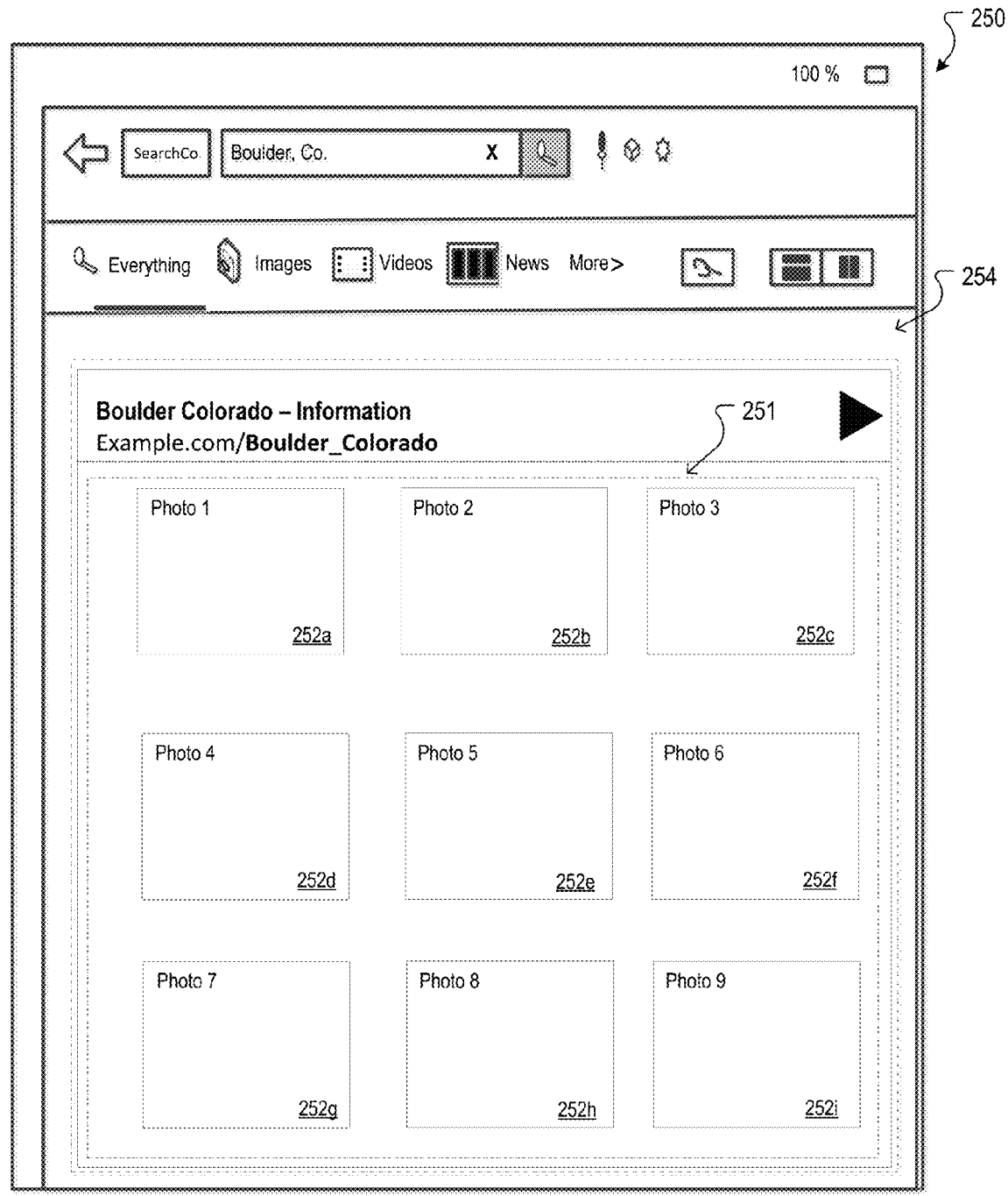

FIG. 2G is a screenshot of an example search interface 250 in which a content portion 251 has been expanded to present photos 252a-252i. The photos can be included in a single extended result card or can each be in a separate extended result card. As described above, the photos could be images identified using an image search system that provides image search results in response to a user query.

As illustrated by FIG. 2G, the content portion 251 has been expanded to fill substantially all of the display area 254 in which the search results are presented. If more extended result content, such as more images or a map of Boulder, Colo., is available for presentation in other extended result cards, this additional extended result content can be presented in response to user interaction with the content portion 251. For example, in response to a user swipe (e.g., from right to left) across the content portion 251, a new extended result card (or multiple extended result cards) can be presented in the content portion 251. The new extended result card can include, for example, additional images that have been identified as relevant to the query "Boulder, Colo.", a map of Boulder, Colo., or weather information for Boulder, Colo.

Figure 3:
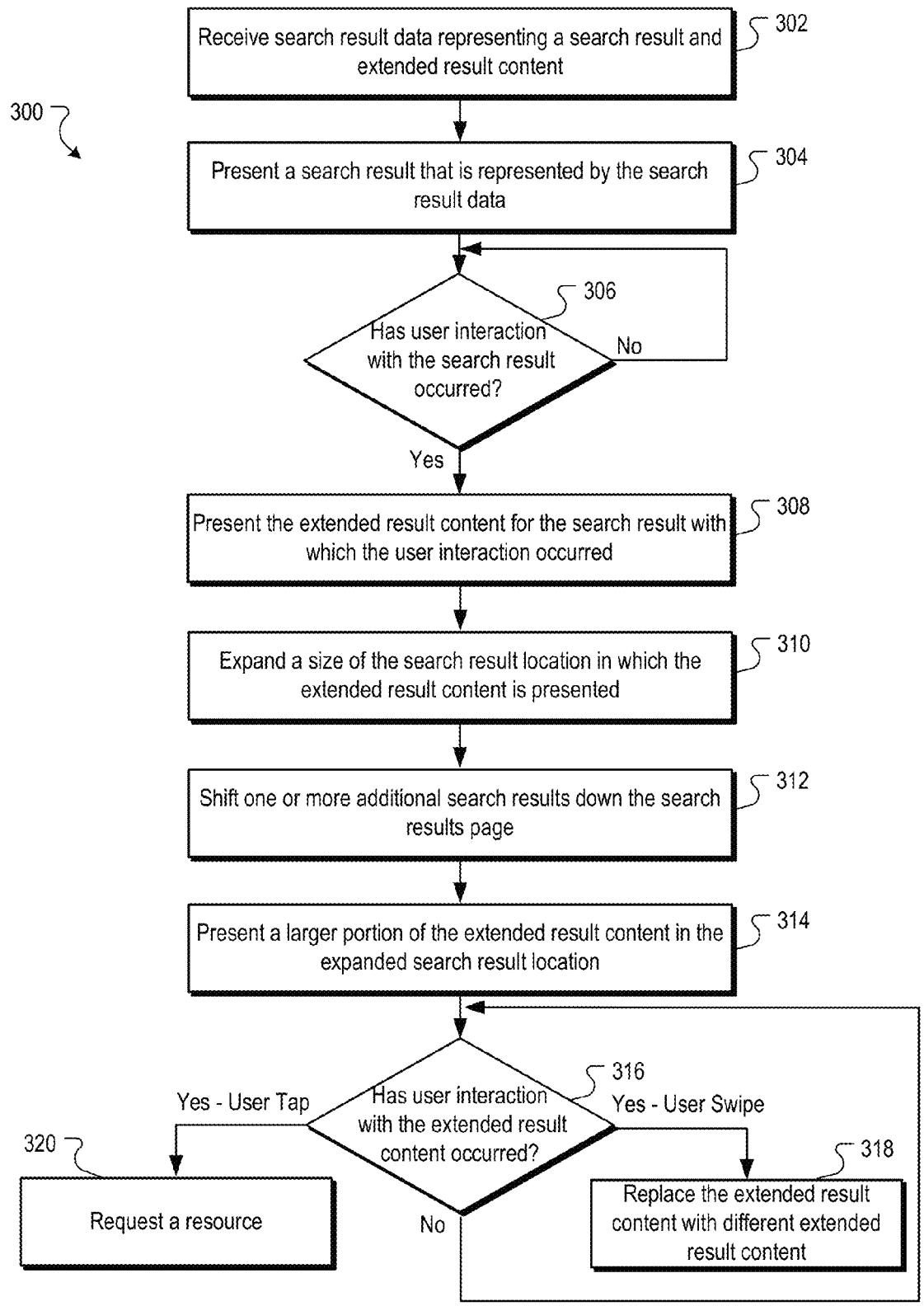
FIG. 3 is a flow chart of an example process for presenting extended result content in search results.

FIG. 3 is a flow chart of an example process 300 for presenting extended result content in search results. The process 300 can be implemented, for example, at a user device, such as a tablet computing device that includes a touch screen that receives input from a pointer such as a finger or a mechanical pointing device. The process 300 can also be implemented by a desktop or other computing device that receives input from an electronic pointer such as a virtual pointer that is controlled using a mouse. The description that follows refers to user swipes and user taps using a mechanical pointer. In some implementations where an electronic pointer is used to interact with a search interface, a click of the mouse can be interpreted as a user tap. Another electronic interaction, such as a "click and drag" can be interpreted as a user swipe. The process 300 can also be implemented as instructions stored on computer storage medium such that execution of the instructions by data processing apparatus cause the data processing apparatus to perform the operations of the process 300.

Search result data representing a search result and extended result content are received (302). The search result data include data that cause presentation of a search result at a user device. For example, the search result data can specify a title for the search result, a network location (e.g., a network domain and/or specific URL within the domain) for a resource that is referenced by the search result, and/or data that specify a snippet of text from the resource.

The search result data also include data that cause presentation of extended result content. The extended result content can be, for example, an image that includes visual representations of multiple web pages (e.g., two or more web pages) from the network domain to which the search result links. The extended result content can also be other information that has been identified as relevant to the search query for which the search result was provided. In some implementations, at least a portion of the extended result content for at least one search result includes off-page content that was obtained from a resource other than the resource to which the at least one search result is linked. The data that cause presentation of the extended result content may include data that prevent presentation of the extended result content until a specified user interaction is detected, such as a user swipe. The search result data can be received by a user device, such as a tablet computing device that includes a touch interface.

The search result that is represented by the search result data is presented at the user device (304). The search result can be presented in a search interface similar to that described above with reference to FIGS. 2A-2G. For example, the search result can be presented in a search result location of a search results page, where the search result location has a perimeter of a specified perimeter length and the search result is bounded by the perimeter of the search result location.

A determination is made whether user interaction with the search result has occurred (306). In some implementations, the user interaction is a user interaction that is indicative of a user request for presentation of extended result content for the search result. For example, the user interaction can be user interaction with an extended result interface element (e.g., a virtual button) that initiates presentation of the extended result content. The extended result interface element can be presented, for example, in (or adjacent to) the search result location for the search result and each search result can have a corresponding extended result interface element.

In some implementations, the user interaction that is indicative of a user request for presentation of the extended result content is a user swipe of the search result. The user swipe can be determined to have occurred, as described above with reference to FIG. 2B. For example, the user swipe of the search result can be determined to have occurred in response to detecting a pointer at multiple locations along a path that extends between two display points, where at least two of the multiple locations at which the pointer has been detected are at least a threshold distance apart. At least one location along the path (e.g., the initial location at which the pointer was detected), can be required to be within a threshold distance of the search result. For example, the initial location along the path at which the pointer is detected can be required to be within the search result location for the search result.

In some implementations, presentation of the extended result content is prevented prior to detecting user interaction with the search result. Therefore, the determination of whether a user interaction with the search result has occurred can be iteratively performed while not presenting the extended result content.

In response to determining that the user interaction indicative of a request for presentation of the extended result content has occurred, a portion (e.g., less than 100%) of the extended result content for the search result is presented in the search result location (308). In some implementations, the portion of the extended result content can replace a portion of the search result (e.g., content that was presented in a content portion of the search result, while maintaining presentation of another portion of the search result (e.g., content presented in the reference portion), as described with reference to FIG. 2B. For example, the extended result content for the search result can replace a text snippet for the search result, while a title and/or network location can continue to be presented in the search result.

In some implementations, the replacement of the portion of the search result is an animated transition from the portion of the search result to the extended result content. For example, as described above with reference to FIG. 2B the animation can cause the extended result content to visually "scroll" into the search result location as the content that is being replaced "scrolls" out of the search result location. The "scrolling" of the extended result content and/or the content being replaced can be in a same direction as the user swipe.

A size of the search result location in which the extended result content is presented is expanded (310). In some implementations, the search results location is expanded to have a larger perimeter than the search result location in which the search result was initially presented. Therefore, the perimeter length of the expanded search result location will exceed the perimeter length of the initial search result location. The perimeter of the search result location can be expanded, for example, by increasing a vertical length of the search result location, as described above with reference to FIG. 2D. In some implementations, the perimeter of the search result location is expanded to fill at least a threshold portion or all of the display of the user device.

One or more additional search results are shifted down the search results page (312). As described above with reference to FIG. 2D, the additional search results (e.g., those search results with which the user did not most recently interact) are shifted down the search results page to make room for presentation of the expanded search result location. The distance by which one or more of the additional search results are shifted can be based on a distance by which the vertical length is increased. For example, the distance by which the additional search results are shifted down the search results page can be the same as, or proportional to, the distance by which the vertical length is increased.

A larger portion of the extended result content is presented in the expanded search result location (314). The portion of the extended result content that is presented in the expanded search result location will depend on the distance by which vertical length of the search result location was increased. For example, if the distance by which the vertical length was increased increases the size of the search result location enough for presentation of an entire extended result card in which the extended result content is included, then all of the extended result content included on that extended result card can be displayed. Otherwise, difference in size between the initially presented extended result content and the larger portion of the extended result content will be limited based on the vertical length of the expanded search result location.

A determination is made whether a specified user interaction with the extended result content has occurred (316). In some implementations, a determination of whether a user swipe of the extended result content has occurred can be performed in a manner similar to that described above with reference to determining that a user swipe of the search result occurred. In response to determining that a user swipe of the extended result content has occurred, the extended result content is replaced with different extended result content (318). In some implementations, the different extended result content is included on a different extended result card and includes additional information that has been identified as relevant to the search query, as described above with reference to FIGS. 2E-2G.

In some implementations, a determination of whether a user tap of the extended result content has occurred. For example, if a pointer is detected at a location that is within a threshold distance of the extended result content, a user tap of the extended result content can be considered to have occurred. In response to determining that a user tap of the extended result content has occurred, a request for a resource referenced by the extended result content can be initiated (320). If more than one resource is referenced by the extended result content, the resource that is requested can be the resource that is within a threshold distance of the location at which the user tap was detected. Alternatively, the requested resource can be the resource that is presented closest to the location at which the user tap was detected.

Figure 4:
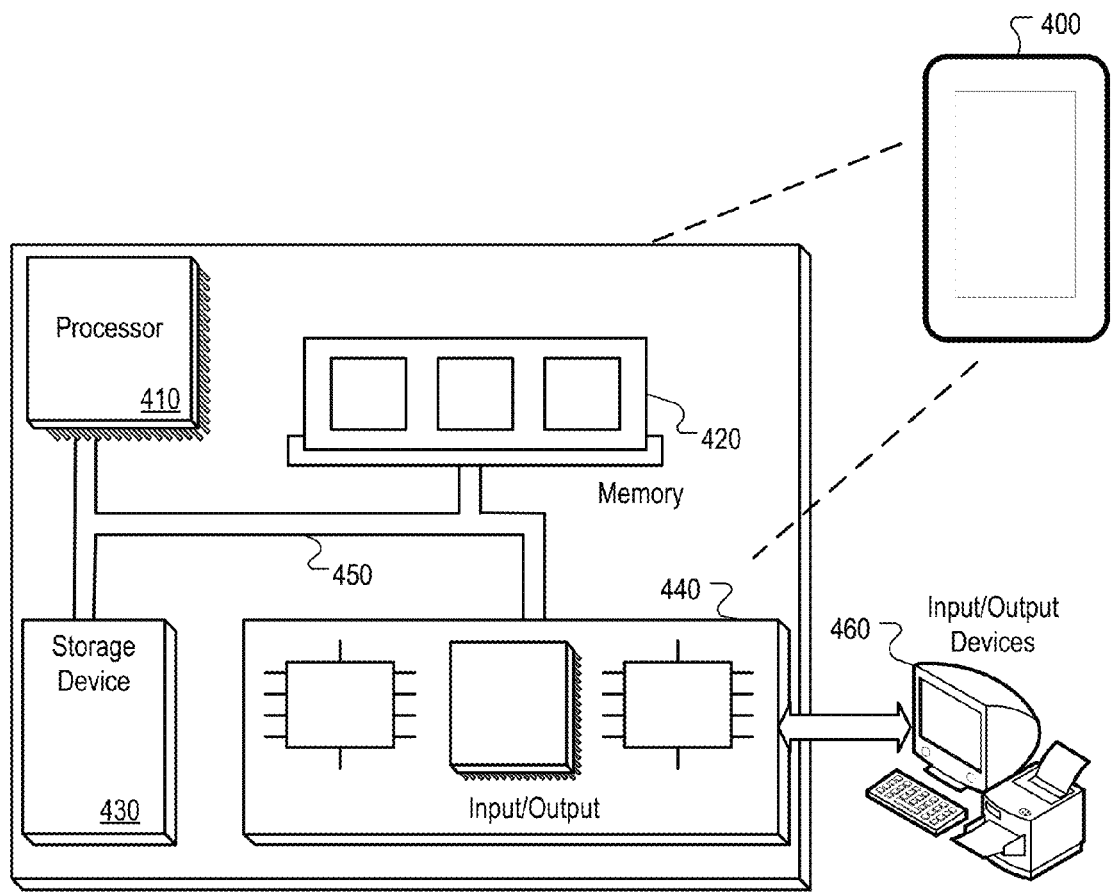
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving search result data representing a search result that includes:
        a link to a given resource;
        content obtained from the given resource; and
        extended result content that was obtained from one or more resources that are each different from the given resource and that are not linked to by the search result;
    presenting the search result in a search result location of a search results page without the extended result content, the search result location having a first perimeter length;
    determining, based on data generated through a first user interaction with the search result, that a user is requesting presentation of the extended result content for the search result;
    in response to the first user interaction:
        presenting, within the search result location, a first portion of the extended result content while maintaining presentation of at least a portion of the search result including at least a portion of the content obtained from the given resource;
        expanding a size of the search result location in which the extended result content is presented, the search result location being expanded to have a second perimeter of a second perimeter length that exceeds the first perimeter length; and
        presenting a larger portion of the extended result content in the expanded search result location;
    determining, based on data generated through a second user interaction with the first portion of the extended result content, that the user is requesting presentation of additional extended result content for the search result; and
    in response to the second user interaction, replacing the first portion of the extended result content for the search result with a second portion of the extended result content for the search result while maintaining presentation of the at least a portion of the search result including the at least a portion of the content obtained from the given resource, the second portion of the extended result content being different from the first portion of the extended result content.

2. The method of claim 1, wherein presenting the first portion of the extended result content comprises replacing only a portion of the search result with the first portion of the extended result content.

3. The method of claim 2, wherein replacing a portion of the search result with the first portion of the extended result content comprises animating the portion of the search result in a manner that causes the portion of the search result to move in a direction of a user swipe.

4. The method of claim 3, wherein replacing a portion of the search result with the first portion of the extended result content comprises animating the first portion of the extended result content in a manner that causes the first portion of the extended result content to move in the direction of the user swipe until the first portion of the extended result content has completely replaced the portion of the search result.

5. The method of claim 1, wherein determining, based on data generated through a first user interaction with the search result, that the user is requesting presentation of the extended result content for the search result comprises determining that a user swipe occurred, the determination that the user swipe has occurred being based, at least in part, on detection of a pointer at multiple locations along a path that extends from a first display location to a second display location, the first display location being within a threshold distance of the search result location.

6. The method of claim 1, wherein expanding a size of the search result location comprises increasing a vertical length of the search result location.

7. The method of claim 6, further comprising shifting one or more additional search results down the search results page, a distance of the shifting being based on a distance by which the vertical length is increased.

8. The method of claim 1, further comprising preventing presentation of the extended result content prior to user interaction with the search result.

9. The method of claim 8, wherein receiving search result data representing the extended result content comprises receiving image data that represent two or more web pages of a network domain that is referenced by the search result.

10. The method of claim 8, wherein receiving search result data representing the extended result content comprises receiving information that has been identified as relevant to the search query for which the search result was provided, the received information having been obtained from a vertical specific search.

11. The method of claim 1, wherein determining, based on data generated through a first user interaction with the search result, that the user is requesting presentation of the extended result content for the search result comprises determining that a user interacted with an extended result element that was presented in the search result location.

12. The method of claim 1, wherein determining based on data generated through a first user interaction with the search result, that the user is requesting presentation of the extended result content for the search result comprises determining that a user swipe of the first portion of the extended result content has occurred.

13. The method of claim 1, further comprising:
    determining that a user tap on the extended result content has occurred; and
    initiating a request for a resource that was visually represented at a display location that is within a threshold distance of a location at which the user tap was detected.

14. A computer storage medium encoded with a computer program, the program comprising instructions that when executed by data processing apparatus cause the data processing apparatus to perform operations comprising:
    receiving search result data representing a search result that includes:
        a link to a given resource;
        content obtained from the given resource; and
        extended result content that was obtained from one or more resources that are each different from the given resource and that are not linked to by the search result;
    presenting the search result in a search result location of a search results page without the extended result content, the search result location having a first perimeter length;

determining, based on data generated through a first user interaction with the search result, that a user is requesting presentation of the extended result content for the search result;

in response to the first user interaction:

presenting, within the search result location, a first portion of the extended result content while maintaining presentation of at least a portion of the search result including at least a portion of the content obtained from the given resource;

expanding a size of the search result location in which the extended result content is presented, the search result location being expanded to have a second perimeter of a second perimeter length that exceeds the first perimeter length; and presenting a larger portion of the extended result content in the expanded search result location;

determining, based on data generated through a second user interaction with the first portion of the extended result content, that the user is requesting presentation of additional extended result content for the search result; and in response to the second user interaction, replacing the first portion of the extended result content for the search result with a second portion of the extended result content for the search result while maintaining presentation of the at least a portion of the search result including the at least a portion of the content obtained from the given resource, the second portion of the extended result content being different from the first portion of the extended result content.

15. A system comprising:

a display in which search results are presented to a user;

one or more processors configured to perform operations including:

receiving search result data representing a search result that includes:

a link to a given resource;

content obtained from the given resource; and extended result content that was obtained from one or more resources that are each different from the given resource and that are not linked to by the search result;

presenting the search result in a search result location of a search results page without the extended result content, the search result location having a first perimeter length;

determining, based on data generated through a first user interaction with the search result, that a user is requesting presentation of the extended result content for the search result;

in response to the first user interaction:

presenting, within the search result location, a first portion of the extended result content while maintaining presentation of at least a portion of the search result including at least a portion of the content obtained from the given resource;

expanding a size of the search result location in which the extended result content is presented, the search result location being expanded to have a second perimeter of a second perimeter length that exceeds the first perimeter length; and presenting a larger portion of the extended result content in the expanded search result location;

determining, based on data generated through a second user interaction with the first portion of the extended result content, that the user is requesting presentation of additional extended result content for the search result; and in response to the second user interaction, replacing the first portion of the extended result content for the search result with a second portion of the extended result content for the search result while maintaining presentation of the at least a portion of the search result including the at least a portion of the content obtained from the given resource, the second portion of the extended result content being different from the first portion of the extended result content.

16. The system of claim 15, wherein presenting the first portion of the extended result content comprises replacing only a portion of the search result with the first portion of the extended result content.

17. The system of claim 16, wherein replacing a portion of the search result with the first portion of the extended result content comprises animating the portion of the search result in a manner that causes the portion of the search result to move across the display in a direction of a user swipe.

18. The system of claim 17, wherein replacing a portion of the search result with the first portion of the extended result content comprises animating the first portion of the extended result content in a manner that causes the first portion of the extended result content to move across the display in the direction of the user swipe until the first portion of the extended result content has completely replaced the portion of the search result.

19. The system of claim 15, wherein determining, based on data generated through a first user interaction with the search result, that the user is requesting presentation of the extended result content for the search result comprises determining that a user swipe occurred, the determination that the user swipe has occurred being based, at least in part, on detection of a pointer at multiple locations along a path that extends from a first display location to a second display location, the first display location being within a threshold distance of the search result location.

20. The system of claim 15, wherein expanding a size of the search result location comprises increasing a vertical length of the search result location.

21. The system of claim 20, further comprising shifting one or more additional search results down the search results page, a distance of the shifting being based on a distance by which the vertical length is increased.

22. The system of claim 15, wherein the one or more processors are further configured to perform operations comprising preventing presentation of the extended result content at the display prior to user interaction with the search result.

23. The system of claim 22, wherein receiving search result data representing the extended result content comprises receiving image data that represent two or more web pages of a network domain that is referenced by the search result.

24. The system of claim 22, wherein receiving search result data representing the extended result content comprises receiving information that has been identified as relevant to the search query for which the search result was provided, the received information having been obtained from a vertical specific search.

25. The system of claim 15, wherein determining, based on data generated through a first user interaction with the search result, that the user is requesting presentation of the extended result content for the search result comprises determining that a user interacted with an extended result element that was presented in the search result location.

26. The system of claim 15, wherein determining based on data generated through a first user interaction with the search result, that the user is requesting presentation of the extended result content for the search result comprises determining that a user swipe of the first portion of the extended result content has occurred.

27. The system of claim 15, wherein the one or more processors are further configured to perform operations comprising:
  determining that a user tap on the extended result content has occurred; and initiating a request for a resource that was visually represented at a display location that is within a threshold distance of a location at which the user tap was detected.

* * * * *